US011926358B2

(12) United States Patent
Moore et al.

(10) Patent No.: US 11,926,358 B2
(45) Date of Patent: Mar. 12, 2024

(54) UTILITY CART AND CART ACCESSORIES

(71) Applicant: JS Products, Inc., Las Vegas, NV (US)

(72) Inventors: James Moore, Las Vegas, NV (US);
James Stobar, Las Vegas, NV (US)

(73) Assignee: JS Products, Inc., Las Vegas, NV (US)

( * ) Notice: Subject to any disclaimer, the term of this patent is extended or adjusted under 35 U.S.C. 154(b) by 64 days.

(21) Appl. No.: 17/507,389

(22) Filed: Oct. 21, 2021

(65) Prior Publication Data
US 2022/0126899 A1 Apr. 28, 2022

Related U.S. Application Data

(60) Provisional application No. 63/104,502, filed on Oct. 22, 2020.

(51) Int. Cl.
*B62B 3/00* (2006.01)
*B62B 3/02* (2006.01)
*B62B 5/00* (2006.01)

(52) U.S. Cl.
CPC ............... *B62B 3/005* (2013.01); *B62B 3/02* (2013.01); *B62B 5/00* (2013.01)

(58) Field of Classification Search
CPC .. B62B 3/005; B62B 3/02; B62B 5/00; B62B 3/10; B62B 2202/48
See application file for complete search history.

(56) References Cited

U.S. PATENT DOCUMENTS

| | | | |
|---|---|---|---|
| 4,499,997 A * | 2/1985 | Swingley, Jr. | B65D 81/261 206/427 |
| 4,763,799 A | 8/1988 | Cohn | |
| 5,566,961 A | 10/1996 | Snell | |
| 5,597,113 A * | 1/1997 | Bradford | B29C 65/4815 229/120.07 |
| D409,016 S | 5/1999 | Haley | |
| D485,410 S | 1/2004 | Landingham, Jr. | |
| D493,019 S | 7/2004 | Lovegrove | |
| D578,269 S | 10/2008 | Landingham, Jr. | |
| D618,419 S | 6/2010 | Catron | |

(Continued)

FOREIGN PATENT DOCUMENTS

CN 108974058 A * 12/2018
KR 200391403 Y1 * 8/2005

OTHER PUBLICATIONS

Grainger Choice, "Plastic Utility Carts: Ergonomics", www.Grainger.com/choice, Copyright 2015, 1 page.

(Continued)

*Primary Examiner* — James A Shriver, II
*Assistant Examiner* — Ian Bryce Shelton
(74) *Attorney, Agent, or Firm* — Weide & Miller, Ltd.

(57) ABSTRACT

A utility cart has a lower platform comprising a lower recessed storage area, an upper platform comprising an upper recessed storage area, a plurality of legs extending upwardly from the lower platform and supporting the upper platform in spaced relationship from the lower platform, a handle extending from the raised platform, a plurality of wheels connected to the lower platform and rollably supporting the cart, a configurable divider for selective location in the upper recessed storage area for dividing the upper recessed storage area into a plurality of compartments, and one or more tool holders.

16 Claims, 8 Drawing Sheets

(56) References Cited

U.S. PATENT DOCUMENTS

| | | | |
|---|---|---|---|
| D817,584 S | 5/2018 | Phillips | |
| 10,137,916 B1* | 11/2018 | Glassberg | B62B 3/102 |
| 10,239,547 B1* | 3/2019 | Mohan | B62B 3/008 |
| D859,772 S | 9/2019 | Walter | |
| 10,427,702 B2* | 10/2019 | Phillips | B62B 3/02 |
| 10,569,412 B1* | 2/2020 | Reyes | B25H 3/021 |
| D917,822 S | 4/2021 | Matecki | |
| D935,727 S | 11/2021 | Walter | |
| 11,427,263 B1* | 8/2022 | Dusold | B62B 3/02 |
| 2002/0030337 A1* | 3/2002 | Calmeise | B62B 3/02 280/47.35 |
| 2004/0227315 A1 | 11/2004 | Landingham, Jr. | |
| 2005/0280228 A1* | 12/2005 | Fernandes | B25H 1/00 280/47.35 |
| 2007/0062839 A1* | 3/2007 | Patterson | B25H 3/02 206/523 |
| 2007/0182114 A1* | 8/2007 | Fernandes | B65H 49/32 280/47.35 |
| 2013/0033014 A1* | 2/2013 | Yang | B62B 3/02 280/47.35 |
| 2014/0263351 A1* | 9/2014 | Youell | B31B 50/00 220/552 |
| 2015/0097348 A1* | 4/2015 | Steinfels | F16M 11/2092 280/47.35 |
| 2016/0009306 A1* | 1/2016 | Garcia | B62B 3/005 280/47.35 |
| 2017/0369200 A1* | 12/2017 | Youell | B65D 5/48046 |
| 2018/0111635 A1* | 4/2018 | Oltman | B62B 3/10 |
| 2019/0111956 A1* | 4/2019 | Phillips | B62B 5/0461 |
| 2022/0126899 A1 | 4/2022 | Moore | |

OTHER PUBLICATIONS

Rubbermaid Commercial Products, "Material Handling Heavy-Duty Carts & Trucks", www.rcpmaterialhandling.com, Copyright 2009, 9 pages.

* cited by examiner

UTILITY CART AND CART ACCESSORIES

RELATED APPLICATION DATA

The present application claims priority to U.S. Provisional Application Ser. No. 63/104,502, filed Oct. 22, 2020, which application is incorporated herein in its entirety by reference.

FIELD OF THE INVENTION

The present invention relates to work element supports, such as utility carts.

BACKGROUND OF THE INVENTION

A variety of movable workpiece supports are known, including of the variety known as utility carts. One variation of such a cart is constructed of metal and has a lower platform and an upper platform and is mounted on wheels. A user may place objects on either platform and move them by moving the cart.

These and other carts, however, have very limited associated functionality. For example, while such as cart as disclosed above may be used for simple tasks such as supporting a projector and then moving the projector from class-room to class-room, such as cart is not as useful in various work settings, such as where a user may need to transport tools and other elements.

An improved utility cart is desired.

SUMMARY OF THE INVENTION

Embodiments of the invention comprise a work element support, such as a utility cart, and a method of using a utility cart.

In one embodiment, the utility cart comprises a lower platform comprising a lower recessed storage area, an upper platform comprising an upper recessed storage area, a plurality of legs extending upwardly from the lower platform and supporting the upper platform in spaced relationship from the lower platform, a handle extending from the raised platform, a plurality of wheels connected to the lower platform and rollably supporting the cart, a configurable divider for selective location in the upper recessed storage area for dividing the upper recessed storage area into a plurality of compartments, and one or more tool holders.

In one embodiment, the lower platform may comprise a lower support surface and an upwardly extending peripheral wall, wherein one or more of said tool holders are located in said peripheral wall, such as comprising bores or openings which extend downwardly into said wall.

The upper platform may similarly comprise an upper support surface and an upwardly extending outer wall.

The cart may include one or more utility hooks, such as connectable to the outer wall of the upper platform.

In one embodiment, the cart has a front, a rear, a first side and a second side and the handle extends from the rear. The handle may have a body portion and at least one grip, such as where the body portion if located between the grip and the upper platform. The body portion may define one or more of said tool holders or other storage elements, such as a cup holder and/or trays.

The cart may have four legs. Two or more of the legs may define aligned apertures, such as for receiving a rod therethrough so that the rod is positioned between the legs and the upper and lower platforms. A spool or other element might be mounted on the rod.

The configurable divider may comprise a plurality of divider members which may be connected to one another. The divider members may generally planar and have a top edge and an opposing bottom edge and a plurality of spaced notches extending into the divider member from at least one of the top or bottom edge.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise a utility cart and accessories for a utility cart, such as a utility cart of the invention.

Figure 1:
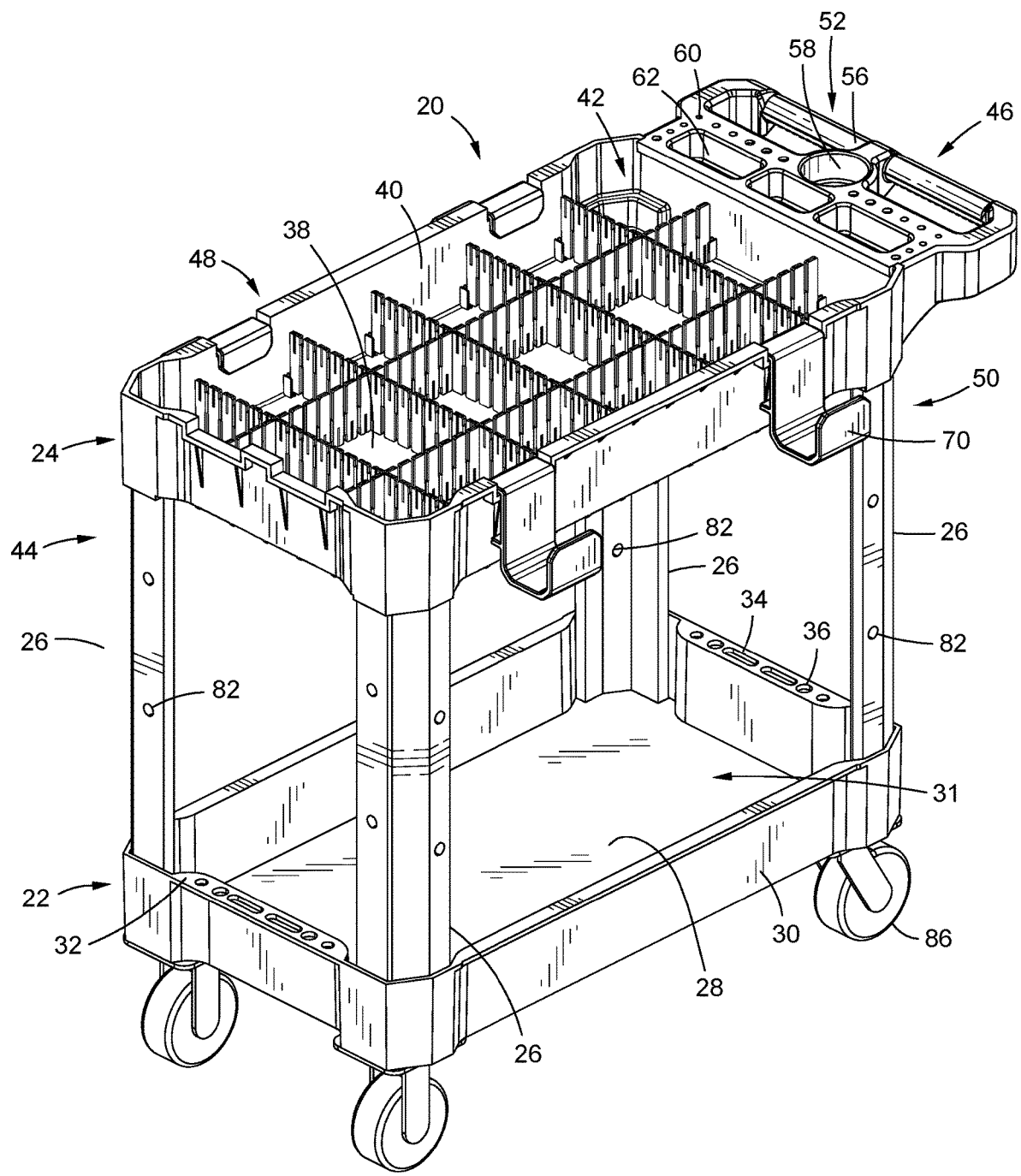
FIG. 1 is a perspective view of a utility cart in accordance with one embodiment of the invention.

As illustrated in FIG. 1, a utility cart 20 comprises a supporting structure, such as a lower platform 22 and an upper platform 24, where the upper platform 24 is supported by and is positioned above (and spaced from) the lower platform 22 by one or more supports, such as legs 26.

The lower platform 22 may comprise a lower support surface 28 and an upwardly extending wall 30, such as a peripheral wall 30. The lower support surface 28 is generally planar and is preferably closed, but might include one or more openings (including by comprising wire mesh or a similar material).

The upwardly extending wall 30 may be located at the periphery of the lower support surface 28. The upwardly extending wall 30 may extend upwardly generally vertically (and thus transversely to the lower support surface 28) and substantially around the periphery of the lower support surface 28 (in other embodiments, the wall 30 might have gaps or openings therein). The upwardly extending wall 30 may cooperate with the lower support surface 28 to define a first or lower, inset or recessed storage area 31.

In one embodiment, the upwardly extending wall 30 has a top 32. One or more tool holders may be associated with the upwardly extending wall 30. The one or more tool holders may comprise openings 34,36 that extend downwardly from the top 32 into the wall 30. The openings may have various shapes and sizes, such as generally cylindrical 36, oval 34 or other shapes, such as for receiving tools or other elements. The openings 34,36 may extend downwardly into the wall a sufficient distance to support a tool or similar element therein, such as the shank portion of a screwdriver therein, such as 2-4 inches or more.

As illustrated, openings 34,36 are provided in the portions of the upwardly extending wall 30 corresponding to the front and rear of the cart 20. However, openings or other tool holders or the like may be provided in the wall 30 at the sides or the like (alternately or as well).

The upper platform 24 may comprise an upper support surface 38 and an outer wall 40. Once again, the upper support surface 38 is generally planar and is preferably closed, but might include one or more openings.

The outer wall 40 may be located at the periphery of the upper support surface 38 and extend upwardly therefrom. The outer wall 40 may cooperate with the upper support surface 38 to define a second or upper, inset or recessed storage area 42.

In one embodiment, the legs 26 extend between the lower platform 22 and the upper platform 24, thus separating them and raising the upper platform above the lower platform. In the illustrated embodiment, the cart 20 includes four legs generally positioned at corners of the cart 20. Further, the legs 26 are generally "L" shaped (so as to have one side which is located at a first or rear of the cart and another side which is located at one of the sides of the cart). However, the legs 26 might have other shapes and locations, such as being rod-shaped, or even generally planar, and being located at the sides or front/rear, etc.

In the illustrated embodiment, the cart 20 is generally rectangular in shape, such as by being longer than it is wide, with a front 44, a rear 46 and a pair of sides 48,50.

In a preferred embodiment, a handle 52 extends outwardly from the upper platform 24 at the rear 46 of the cart 20. The handle 52 may have a body portion which extends outwardly from the upper platform 24 to one or more grips 56. The grips 56 may comprise, for example, one or more generally cylindrical elements which are connected at their ends to the handle 52, and are otherwise spaced therefrom, such as for receiving the hand of a user.

In one embodiment, one or more tool holders or other storage or mounting elements are associated with the handle 52, such as the body portion thereof between the grips 56 and the outer wall 40 of the upper platform 24. The tool holders or storage or mounting elements may comprise, for example, one or more cup holders 58, trays 62 or tool or other holders 60. The cup holder 58 may comprise, for example, a generally cylindrical recess formed in or defined by the body portion of the handle 52. The trays 62 may have various shapes and depths and may similarly comprised recessed holders or might comprise openings or the like in which removable tray or holder elements might be placed. The tool holders 60 may be similar to those associated with the lower platform 22.

In one embodiment, the cart 20 may include one or more utility hooks 70. The hooks 70 may be generally "S" shaped, having a first section which is configured to engage and hang over the outer wall 40 of the upper platform 24, and a second "U" shaped portion for accepting objects thereon (for example, objects hung on the hook 70, or objects set into the hook—such as where elongate objects may be supported by pairs of hooks 70), where the second portion is located outside of the outer wall 40. In one embodiment, the outer wall 40 may have one or more notches 72 (see FIG. 2A) for accepting the hooks 70 in designated locations (such as at the sides or front of the cart 20). In other embodiments, one or more hooks 70 might be associated with the lower platform 22, such as the upwardly extending wall 30 thereof.

Figures 2A, 2B:
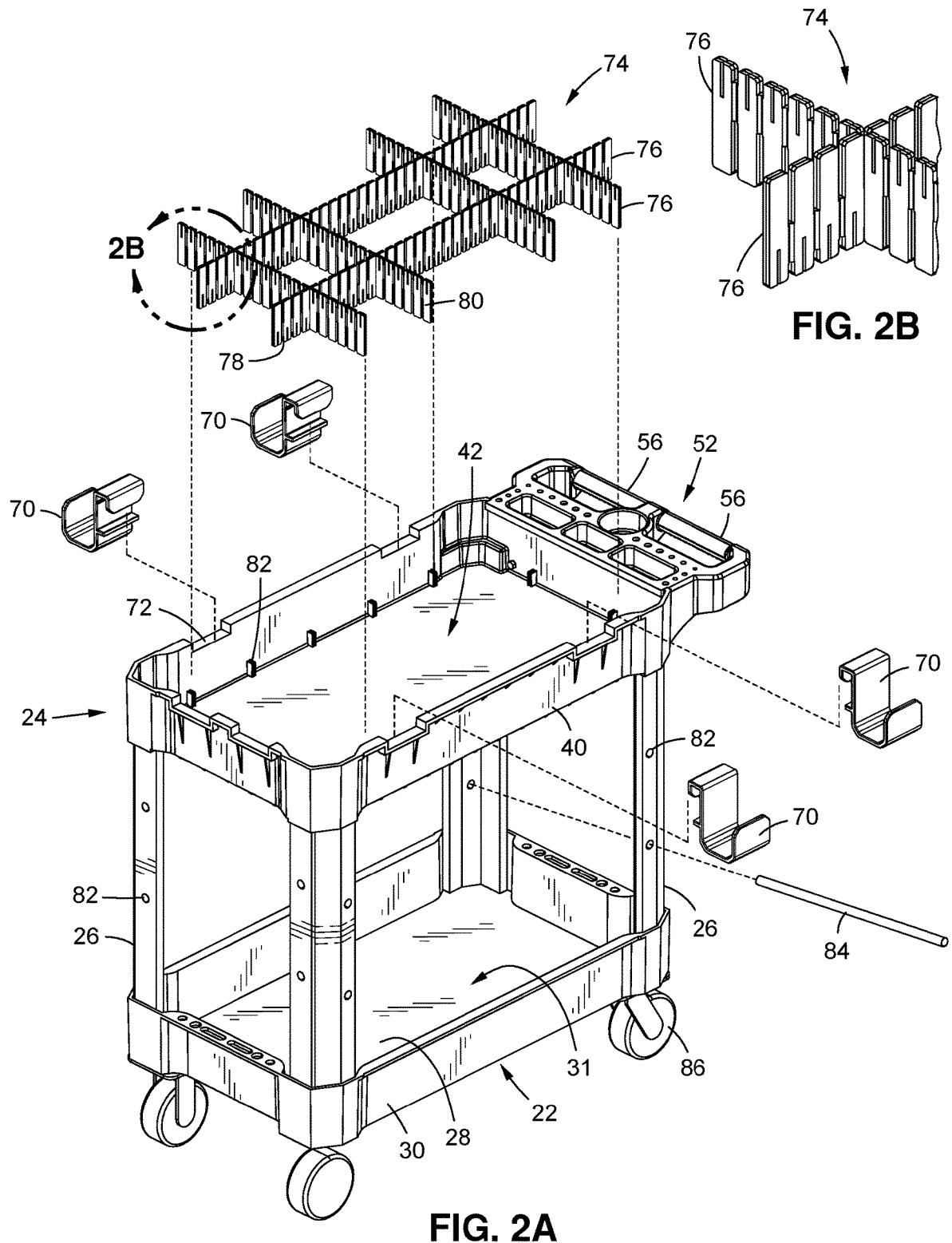
FIG. 2A is an exploded view of the utility cart illustrated in FIG. 1.
FIG. 2B is an enlarged portion of FIG. 2A indicated at 2B.
Figure 3:
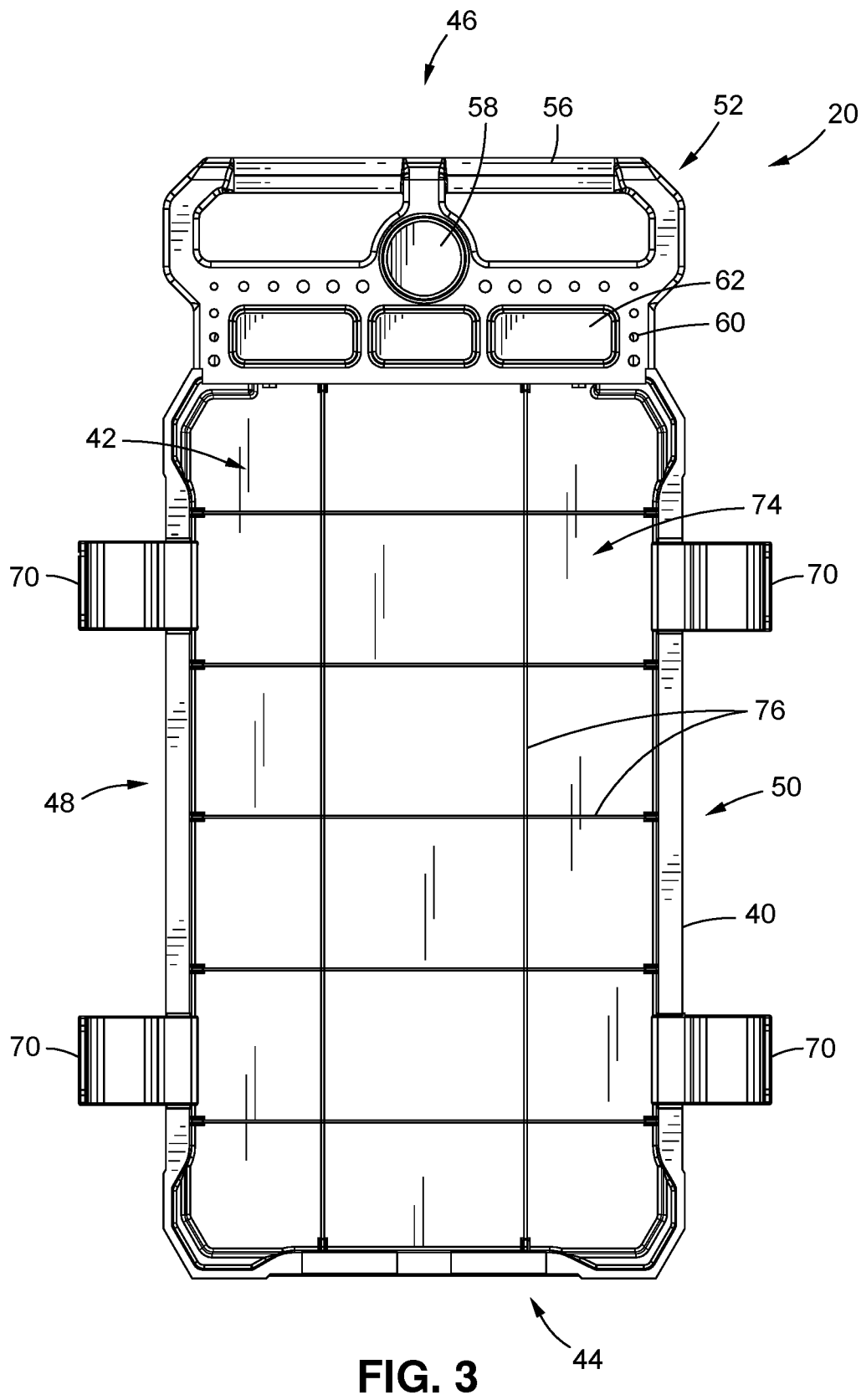
FIG. 3 is a top view of the utility cart illustrated in FIG. 1.
Figure 4:
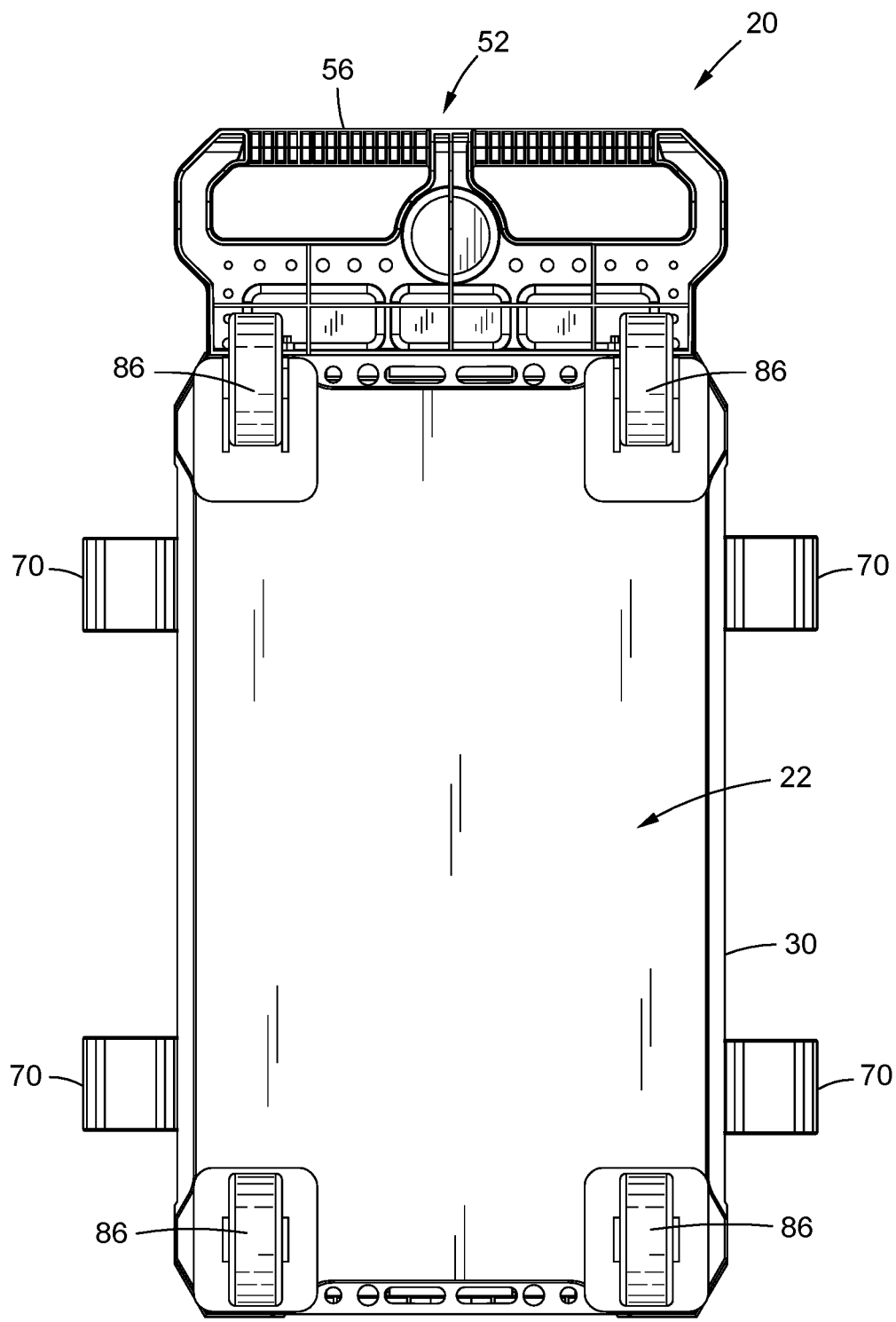
FIG. 4 is a bottom view of the utility cart illustrated in FIG. 1.
Figure 5:
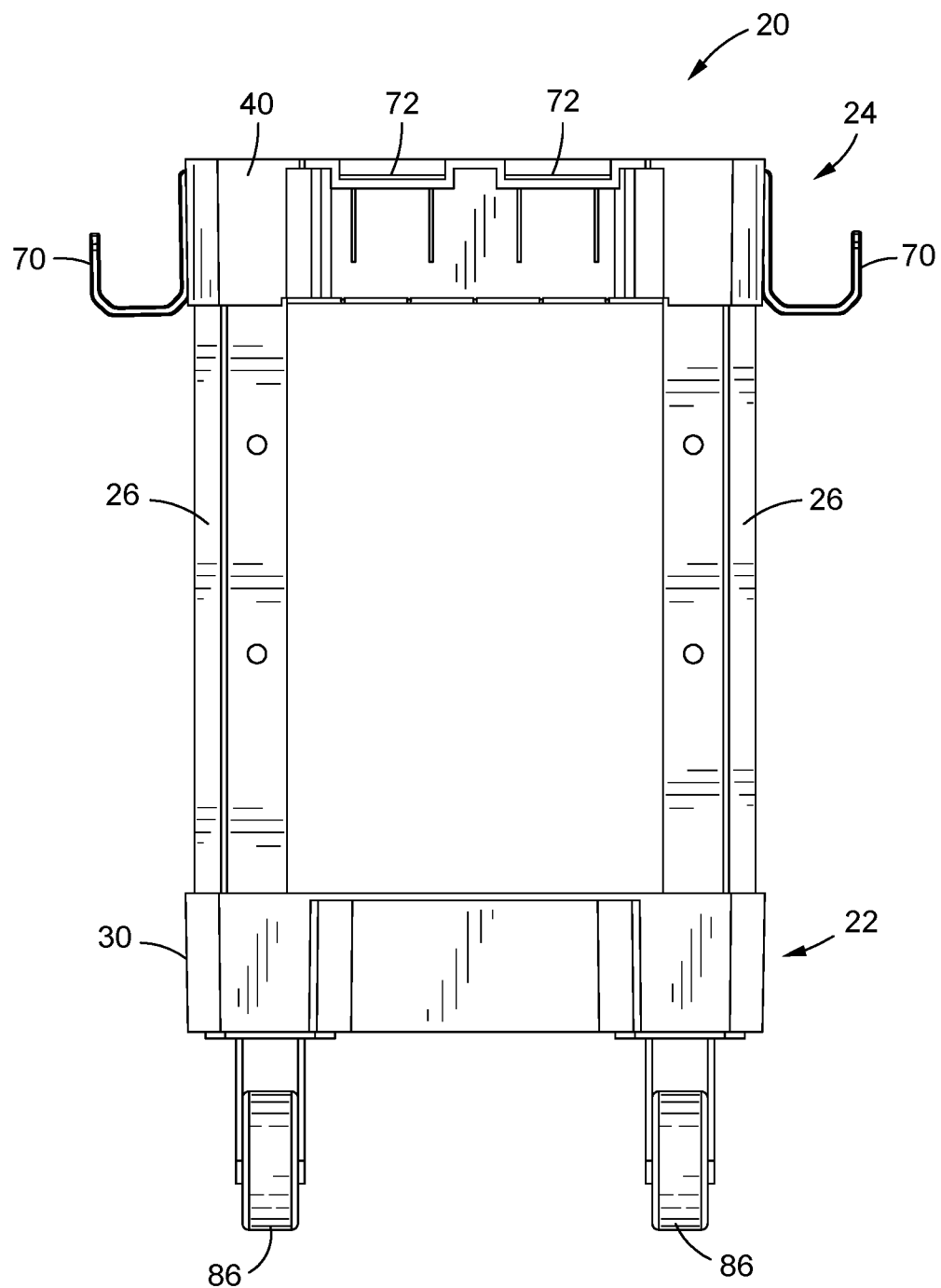
FIGS. 5 and 6 are ends view of the utility cart illustrated in FIG. 1.
Figure 6:
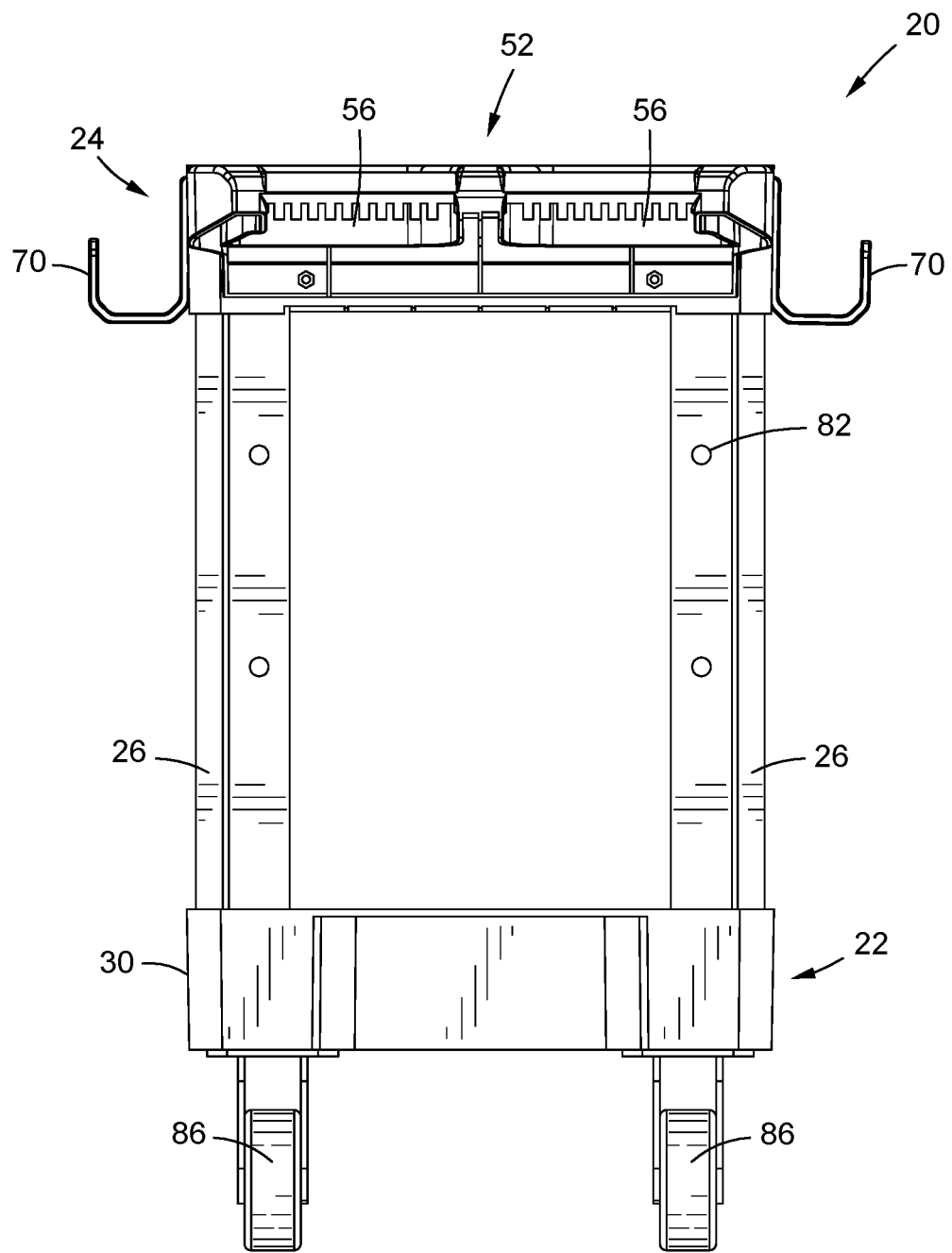
Figure 7:
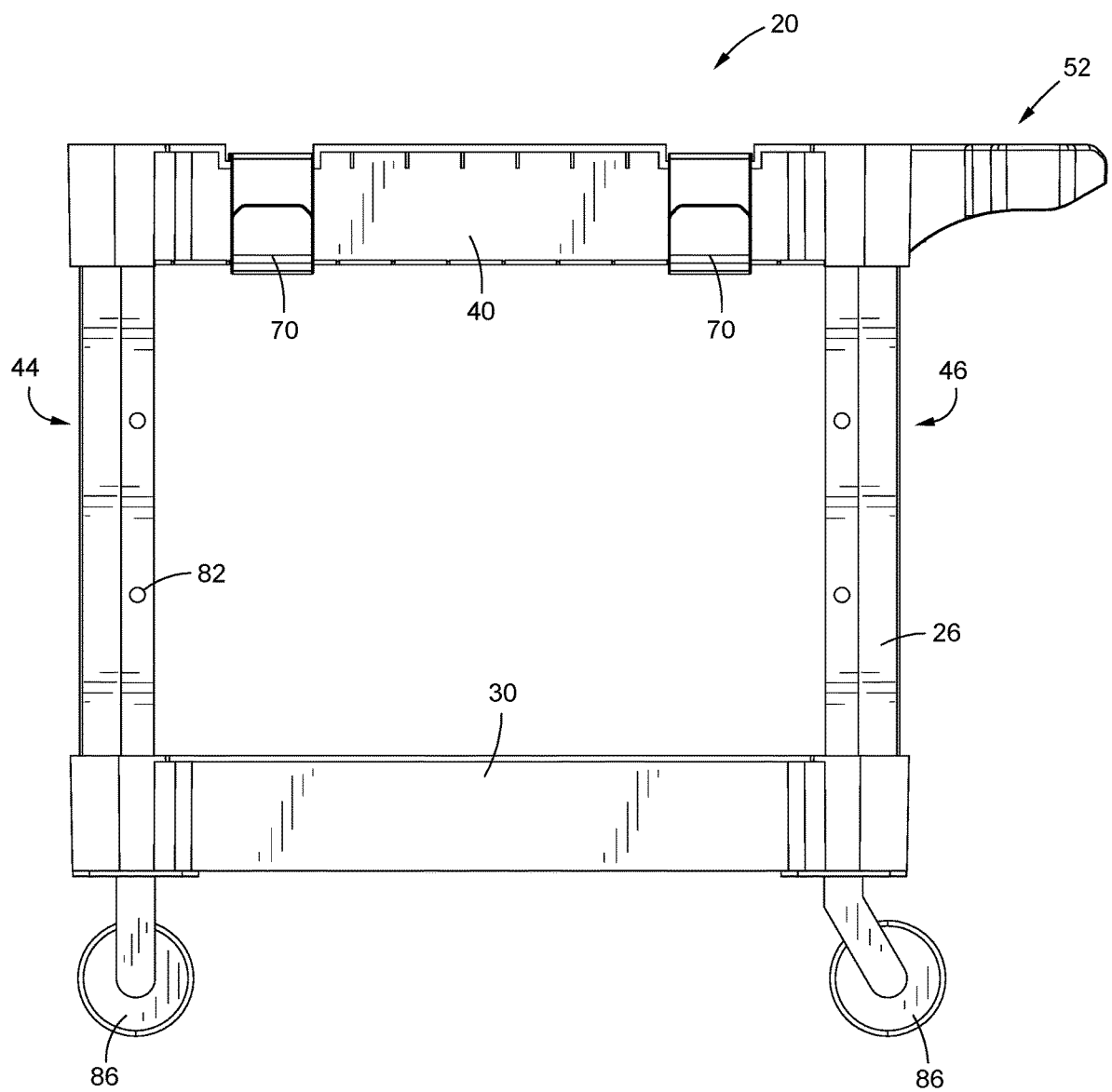
FIGS. 7 and 8 are side views of the utility cart illustrated in FIG. 1.
Figure 8:
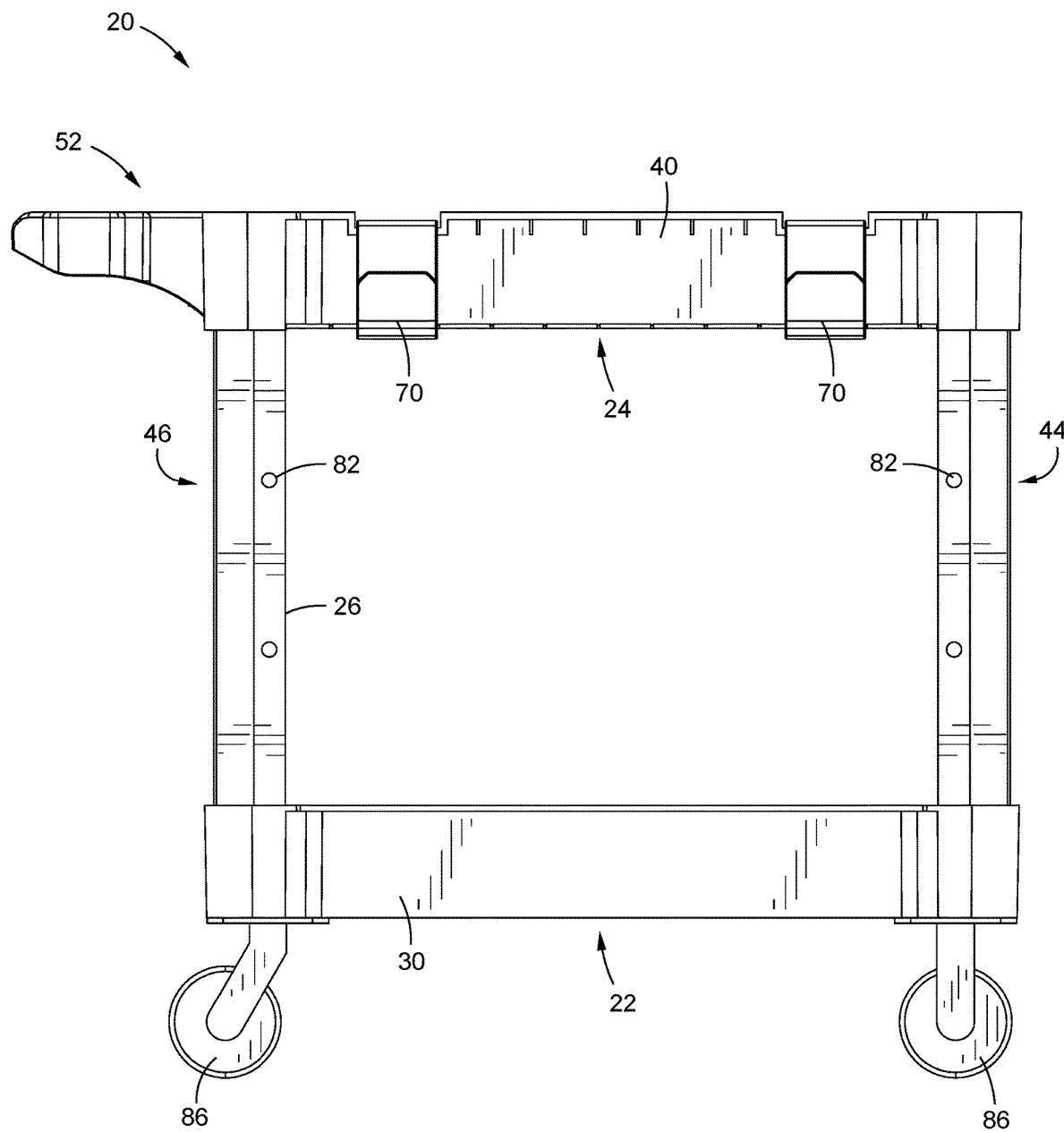

In one embodiment, as illustrated in FIG. 2A, the hooks 70 may be removably mounted to the cart 20, such as by hanging or clipping on to the cart 20. In other embodiments, the hooks 70 might be selectively connected by one or more fasteners. In other embodiments, one or more of the hooks 70 might be integrally formed.

In one embodiment, the cart 20 may include one or more dividers 74. As illustrated in FIG. 1, the one or more dividers 74 might be located in the upper recessed storage area 42 for dividing the storage area 42 into compartments. In other embodiments, the one or more dividers 74 might also be associated with the lower recessed area 31.

In one embodiment, the divider 74 may comprise one or more divider members 76. Each divider member 76 may be generally planar and elongate and define a plurality of slots or tabs 78 with fingers 80 therebetween. In embodiment, the divider member 76 has a top or top edge and a bottom or bottom edge and the plurality of slots or tabs 78 extend from at least one of the edges downwardly towards the other edge (but not completely through the divider member 76).

The divider members 76 may have various lengths. In one embodiment, one or more divider members 76 may have a length corresponding to a length of the recessed storage area 42 in the front to rear direction of the cart 20, and others might have a length corresponding to a width of the recessed storage area 42 in a side to side direction of the cart 20.

Preferably, the divider 74 can be selectively located in the recessed storage area 42 or may be removed therefrom. For example, as illustrated in FIG. 2A, the cart 20 may define a plurality of mounting tabs 82 in the recessed storage area 42. The mounting tabs 82 may each define at least one slot for accepting an end of a divider member 76. In other embodiments, the slots might be defined in the outer wall 40.

In one embodiment, the divider 74 is configurable, such as based upon the number of dividers members 76 utilized, and how they are interconnected. For example, the user might place one or more divider members 76 across the recessed storage area 42 (e.g. in a side 48 to side 50 direction), or allow the recessed storage area 42 (e.g. in a front 44 to rear/back 46 direction). Further, as illustrated in FIGS. 1 and 2A, one or more of the divider members 76 may be interconnected to form a unitary divider 74. In particular, as illustrated in FIGS. 2A and 2B, one divider member 76 may be connected to another one by inverting one relative to another and aligning the mating slots 78 therein. In one embodiment, for example, this allows divider member 76 to be connected transversely to one another, such as to form a grid. When placed into the recessed storage area 42, the divider 74 may thus divide the recessed storage area 42 into a plurality of compartments or sub-areas, such as for storing different tools, work elements or the like.

In one embodiment, the cart 50 may include one or more mounts 82. The mounts 82 may comprise, for example, aligned apertures in the legs 26. For example, aligned apertures may be defined in the front legs 26 in a side to side direction, in the rear legs 26 in a side to side direction, and in corresponding front and back legs 26 in a front to rear/back direction.

A user may connect hooks or other fasteners to one of the mounts 82. In another embodiment, as illustrated in FIG. 2A, a rod 84 may be passed through aligned mounts 82, such as for supporting objects like a wire spool, in the space between the lower and upper platforms 22,24.

In one embodiment, the entire utility cart 20 may be rollably supported, such as by one or more wheels or casters 86 (such as extending downwardly below the lower platform 22). The wheels or casters 86 might be removable.

In a preferred embodiment, portions of the cart 20 may be formed by molding, such as from a lightweight and durable plastic material. However, in other embodiments, the cart 20 might be constructed from other materials and connected by welding, with fasteners, etc.

The utility cart of the invention has various advantages, including being of a simple design to manufacture, including where components thereof may be molded (such as the upper platform with associated handle, the lower platform and the legs), where those elements can then easily and compactly be packaged for shipping, and then easily connected (including by connecting the wheels to the lower platform), such as by an end user. In such a configuration, the cart is also very durable and generally weather-proof (unlike metal carts).

Other advantages of the utility cart are the work and tool features, such as for supporting and/or storing tools or workpieces. In particular, the cart may include a plurality of tool holders and a configurable divider which allows a user to customize a storage area into a plurality of compartments.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A utility cart comprising:
   a lower platform comprising a lower recessed storage area;
   an upper platform comprising an upper recessed storage area;
   a plurality of legs extending upwardly from said lower platform and supporting said upper platform in spaced relationship from said lower platform;
   a handle extending from said upper platform;
   a plurality of wheels connected to said lower platform and rollably supporting said cart;
   a configurable divider for selective location in said upper recessed storage area for dividing said upper recessed storage area into a plurality of compartments;
   one or more tool holders;
   wherein said configurable divider comprises a plurality of lateral connectable divider members and a plurality of longitudinal connectable divider members each having a top edge and an opposing bottom edge, the top edge being spaced a distance from the opposing bottom edge;
   wherein the distance from the top edge of each of the lateral connectable divider members to the bottom edge of each of the lateral connectable divider members is substantially the same as the distance from the top edge of each of the longitudinal divider members to the bottom edge of each of the longitudinal divider members;
   wherein said upper platform comprises an upper support surface and an upwardly extending peripheral wall having a top spaced upwardly from said upper support surface, wherein said peripheral wall has a plurality of notches that each comprise an opposing pair of surfaces each extending downwardly from the top of said peripheral wall, and a ledge extending between the pair of surfaces and being spaced from and parallel to the top of said outer wall, each of said plurality of notches positioned between a corresponding pair of said plurality of lateral connectable divider members; and
   at least one hook for connection to one of said plurality of notches, said at least one hook having a first engaging portion which is configured to extend over said ledge into said recessed storage area and be recessed below the top of said peripheral wall and a second generally "U" shaped supporting portion which is located at an exterior of said peripheral walls to support one or more items externally to said peripheral wall.

2. The utility cart in accordance with claim 1, wherein said lower platform comprises a lower support surface and a lower platform upwardly extending peripheral wall.

3. The utility cart in accordance with claim 2, wherein one or more of said tool holders are associated with said lower platform upwardly extending peripheral wall, at least one of said tool holders comprising an opening extending downwardly into an upper edge of said lower platform upwardly extending wall.

4. The utility cart in accordance with claim 1, wherein said cart has a front, a rear, a first side and a second side and said handle extends from said rear.

5. The utility cart in accordance with claim 4, wherein said handle has a body portion and at least one grip.

6. The utility cart in accordance with claim 5, wherein said body portion is located between said at least one grip and said upper platform.

7. The utility cart in accordance with claim 5, wherein at least one of said one or more tool holders is associated with said body portion.

8. The utility cart in accordance with claim 7, further comprising at least one storage element defined by said body portion, said at least one storage element comprising at least one of: a cup holder and a tray.

9. The utility cart in accordance with claim 7, wherein said one or more tool holders comprises a cylindrical opening extending downwardly into said body portion.

10. The utility cart in accordance with claim 1, further comprising at least one first aperture in a first one of said plurality of legs and at least one second aperture in a second one of said plurality of legs, said first and second apertures aligned with one another.

11. The utility cart in accordance with claim 1, wherein said divider members are generally planar and have a plurality of spaced notches extending into said divider member from at least one of said corresponding top or bottom edge.

12. The utility cart in accordance with claim 11, further comprising at least one slot defined by said upper platform for receiving an end of one of said divider members.

13. The utility cart in accordance with claim 1, further comprising a plurality of mounting tabs disposed in said recessed storage area, wherein said plurality of mounting tabs define a plurality of slots each accepting an end of a corresponding one of the plurality of lateral and longitudinal connectable divider members.

14. A utility cart comprising:
   a lower platform comprising a lower recessed storage area;
   an upper platform comprising an upper recessed storage area;
   a plurality of legs extending upwardly from said lower platform and supporting said upper platform in spaced relationship from said lower platform;
   a handle extending from said upper platform;
   a plurality of wheels connected to said lower platform and rollably supporting said cart;

a configurable divider for selective location in said upper recessed storage area for dividing said upper recessed storage area into a plurality of compartments; and
one or more tool holders,
a plurality of hooks,
wherein said upper platform comprises an upper support surface, an upwardly extending outer wall cooperating with the upper support surface to define the upper recessed storage area, the upwardly extending outer wall having an interior and an exterior and a top, at least a portion of said top defined by a cantilevered rim which extends laterally outwardly of said exterior of said upwardly extending outer wall, said outer wall having a plurality of recessed notches that extend downwardly from said rim of said outer wall, each notch defining a ledge which is located below said rim and has at least one portion which extends laterally outwardly of said exterior of said upwardly extending outer wall generally perpendicular to said upwardly extending outer wall, at least one support extending outwardly from said exterior of said upwardly extending outer wall to an underside of the ledge of each notch to provide support thereto, each of said plurality of notches configured to accept a corresponding one of said plurality of hooks.

15. The utility cart in accordance with claim 14, wherein said configurable divider comprises a plurality of lateral connectable divider members and a plurality of longitudinal connectable divider members, and wherein said plurality of notches are each positioned between a corresponding pair of said plurality of lateral connectable divider members.

16. The utility cart in accordance with claim 14, wherein said at least one support is triangular-shaped.

\* \* \* \* \*